United States Patent
Hirano et al.

(10) Patent No.: US 6,171,370 B1
(45) Date of Patent: Jan. 9, 2001

(54) ADSORBENT FOR SEPARATING GASES

(75) Inventors: Shigeru Hirano, Shinnanyo; Taizo Kawamoto; Toru Nishimura, both of Tokuyama; Keiji Yoshimura, Kudamatsu, all of (JP)

(73) Assignee: Tosoh Corporation, Yamaguchi-ken (JP)

( * ) Notice: Under 35 U.S.C. 154(b), the term of this patent shall be extended for 0 days.

(21) Appl. No.: 09/260,479

(22) Filed: Mar. 2, 1999

(30) Foreign Application Priority Data

Mar. 4, 1998 (JP) .................................................. 10-051639
Jun. 30, 1998 (JP) .................................................. 10-183699

(51) Int. Cl.[7] .................................................. B01D 53/047
(52) U.S. Cl. .................................................. 95/96; 95/103; 95/130; 95/902; 96/130; 502/79
(58) Field of Search ................. 95/96–98, 100–105, 95/130, 902; 423/330.1, 332; 502/79; 96/108, 130

(56) References Cited

U.S. PATENT DOCUMENTS

| | | | |
|---|---|---|---|
| 3,140,933 | * 7/1964 | McKee | 95/130 |
| 4,481,018 | * 11/1984 | Coe et al. | 95/130 |
| 4,859,217 | * 8/1989 | Chao | 95/130 |
| 5,074,892 | * 12/1991 | Leavitt | 95/130 X |
| 5,152,813 | * 10/1992 | Coe et al. | 95/130 X |
| 5,174,979 | * 12/1992 | Chao et al. | 95/130 X |
| 5,258,058 | * 11/1993 | Coe et al. | 95/130 X |
| 5,464,467 | * 11/1995 | Fitch et al. | 95/130 X |
| 5,562,756 | * 10/1996 | Coe et al. | 95/130 X |
| 5,672,195 | * 9/1997 | Moreau et al. | 95/96 |
| 5,868,818 | * 2/1999 | Ogawa et al. | 95/130 X |
| 5,912,422 | * 6/1999 | Bomard et al. | 95/130 X |
| 5,919,287 | * 7/1999 | Moreau | 95/130 |
| 5,922,107 | * 7/1999 | Labasque et al. | 95/130 X |
| 5,962,358 | * 10/1999 | Hees et al. | 95/130 X |
| 6,017,508 | * 1/2000 | Millar et al. | 95/902 X |

FOREIGN PATENT DOCUMENTS

0297542A2 * 1/1989 (EP).
0826631A1 * 3/1998 (EP).

* cited by examiner

Primary Examiner—Robert H. Spitzer
(74) Attorney, Agent, or Firm—Nixon & Vanderhye

(57) ABSTRACT

An adsorbent for separating gases, which comprises a binder and a crystalline low-silica faujasite type zeolite with a $SiO_2/Al_2O_3$ molar ratio of from 1.9 to 2.1, wherein the average pore diameter of the macropores is equal to or larger than the mean free path of an adsorbable component when desorbing the adsorbable component from the adsorbent, and at least 70% of the total volume of the macropores is occupied by macropores having a diameter equal to or larger than the mean free path of the adsorbable component.

18 Claims, 1 Drawing Sheet

Figure 1:
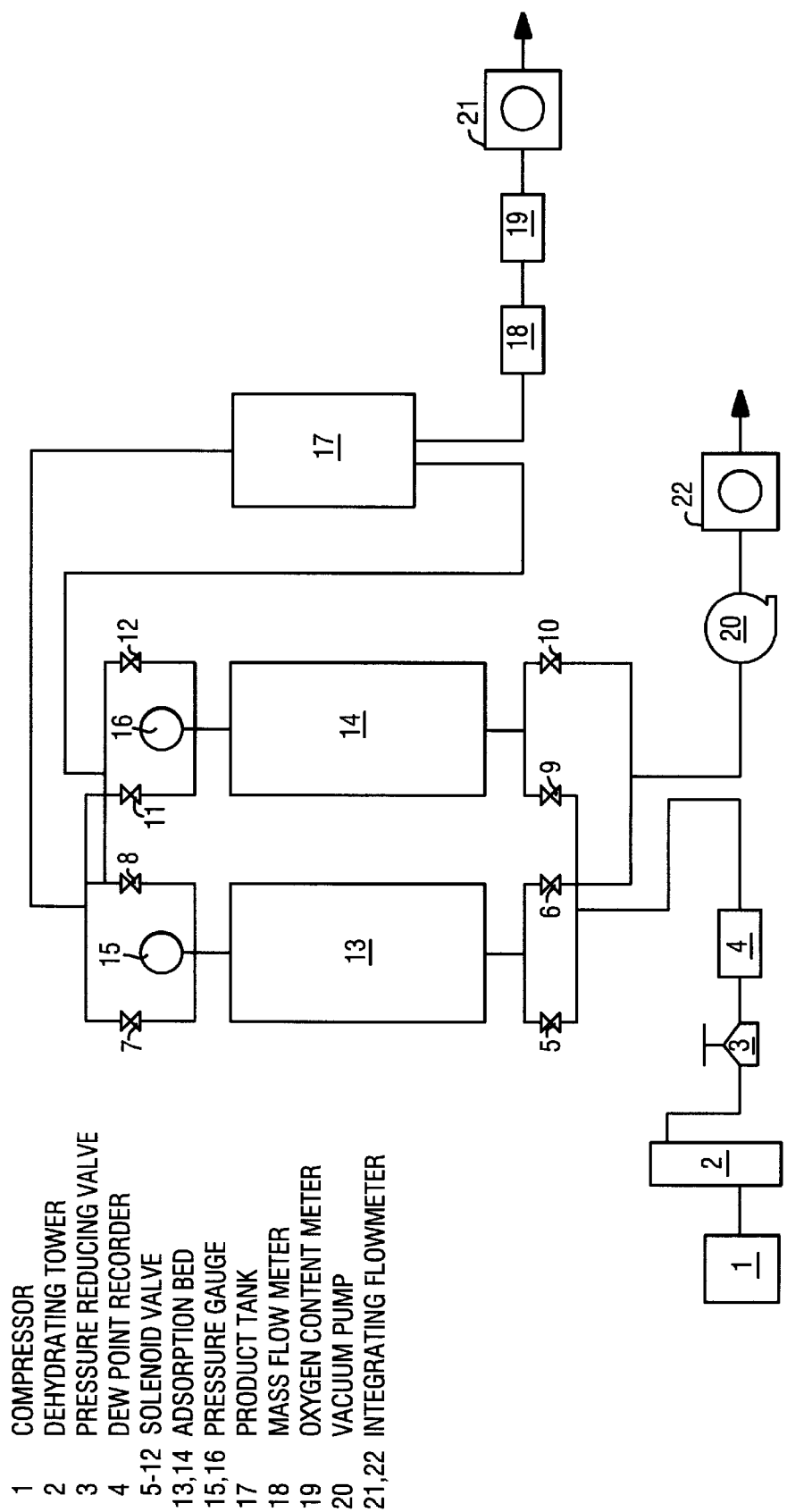

1 COMPRESSOR
2 DEHYDRATING TOWER
3 PRESSURE REDUCING VALVE
4 DEW POINT RECORDER
5-12 SOLENOID VALVE
13,14 ADSORPTION BED
15,16 PRESSURE GAUGE
17 PRODUCT TANK
18 MASS FLOW METER
19 OXYGEN CONTENT METER
20 VACUUM PUMP
21,22 INTEGRATING FLOWMETER

SCHEMATIC DIAGRAM ILLUSTRATING TESTING DEVICE
FOR AIR-SEPARATION PERFORMANCE

SCHEMATIC DIAGRAM ILLUSTRATING TESTING DEVICE
FOR AIR-SEPARATION PERFORMANCE

| | |
|---|---|
| 1 | COMPRESSOR |
| 2 | DEHYDRATING TOWER |
| 3 | PRESSURE REDUCING VALVE |
| 4 | DEW POINT RECORDER |
| 5-12 | SOLENOID VALVE |
| 13,14 | ADSORPTION BED |
| 15,16 | PRESSURE GAUGE |
| 17 | PRODUCT TANK |
| 18 | MASS FLOW METER |
| 19 | OXYGEN CONTENT METER |
| 20 | VACUUM PUMP |
| 21,22 | INTEGRATING FLOWMETER |

ADSORBENT FOR SEPARATING GASES

The present invention relates to an adsorbent for separating gases to separate a gas mixture having a component which is easily adsorbed (adsorbable component) and a component which is hardly adsorbed (adsorption resistant component), and a process for producing it. Particularly, the adsorbent for separating gases of the present invention relates to an adsorbent for separating gases to separate a gas mixture by a pressure swing adsorption method (hereinafter referred to as PSA method for short). The gas to be separated and recovered by PSA method by using the adsorbent for separating gases of the present invention may, for example, be oxygen gas, nitrogen gas, carbon dioxide, hydrogen or carbon monoxide.

Among these, oxygen gas is one of the particularly important industrial gases, and widely used for steel making, bleaching of pulp or the like. Particularly, in recent years, in order to reduce generation of NOx which is inevitable by combustion in air, oxygen-enriched combustion is used practically in the field of refuse burning, glass melting or the like, and oxygen gas is becoming important in view of environmental problems.

As an industrial method for producing oxygen gas, PSA method, a cryogenic distillation processing or a membrane separation method has been known. Among these, PSA method which is advantageous in view of the purity of oxygen gas and cost, is increasingly used. The method for producing oxygen gas by PSA is to adsorb nitrogen gas in air on an adsorbent, and obtain the remaining concentrated oxygen gas as a product. As the adsorbent to be used, an adsorbent capable of selectively adsorbing nitrogen gas is employed.

In the case of separating a gas mixture by using a crystalline zeolite, the adsorbable component is selectively adsorbed on the crystalline zeolite. For example, in the case of producing oxygen gas from air by using PSA method, nitrogen in the air is selectively adsorbed on the crystalline zeolite to carry out separation of the air. Selective adsorption of nitrogen on the crystalline zeolite is due to the strong interaction between quadruple moment of nitrogen and electrostatic force of attraction of cations in the zeolite. Therefore, for PSA method, a crystalline zeolite is used wherein electrostatic force of attraction of cations is high and the amount of nitrogen adsorbed is large, and an adsorbent having A-type or X-type zeolite ion-exchanged with e.g. lithium cations, calcium cations, strontium cations or barium cations is used. Particularly, lithium-exchanged crystalline zeolite X which is ion-exchanged with lithium cations, is excellent in selective adsorption of nitrogen, and used as a crystalline zeolite to obtain concentrated oxygen by PSA method.

For example, U.S. Pat. No. 3,140,933 proposes a lithium-exchanged crystalline zeolite X which is excellent in the equilibrium amount of nitrogen adsorbed and the separation factor calculated from the adsorption isotherm of nitrogen and oxygen, and JP-B-5-25527 reconfirms its performance.

In general, separation of a gas mixture is conducted in a packed bed, and it is preferred that the pressure drop in the packed bed is small. For example, in the case of separating gases by PSA method, in order to decrease the pressure drop in the packed bed and reduce the load to the vacuum pump or the blower constituting the PSA apparatus, the crystalline zeolite is formed into beads or pellets by using a binder, e.g. an inorganic binder such as silica sol or alumina sol. An organic additive may be used depending upon the purpose. In the agglomerate, a network of macropores is formed by the crystalline zeolite and the binder. When the adsorbable component is adsorbed on the adsorption site of the crystalline zeolite existing at the center of the agglomerate, the adsorbable component diffuses in the macropores and reaches to the adsorption site at the center of the agglomerate. And the adsorbable component desorbed from the adsorption site diffuses in the macropores and is evacuated to the exterior of the agglomerate. In order to obtain the expected performance of an adsorbent, some adsorbents have been proposed wherein even the adsorption site existing at the center of the agglomerate can be effectively used, so that the efficiency for adsorption of the adsorbable component can be made high.

For example, a zeolite agglomerate for separating gases wherein A-type zeolite exchanged with calcium cations is used, and the macropore volume is at least 0.3 ml/g (JP-A-58-124539), or a zeolite agglomerate wherein the macropore volume/micropore volume ratio is from 1 to 4.5, and the macropore volume is from 0.3 to 0.7 ml/g (JP-A-62-283812) has been proposed. Further, a process for separating air by using an adsorbent wherein the porosity of the adsorbent and the average diameter of macropores are controlled (JP-A-9-308810) has been proposed.

Such an adsorbent is to improve the adsorption rate when the adsorbable component such as nitrogen in the case of separating air, is adsorbed on the crystalline zeolite, and to reduce the time of contacting the gas mixture with the adsorbent, and no consideration is given to the phenomena when the adsorbed adsorbable component is desorbed under reduced pressure. As adsorption and desorption are repeated in PSA method, in order to obtain the performance of the adsorbent, it is necessary to improve not only the diffusion rate of the adsorbable component when adsorbed, but also the diffusion rate of the adsorbable component when desorbed. Accordingly, none of the conventional adsorbents can be regarded as an adsorbent for separating gases, of which the utilization rate has been sufficiently improved.

The shape of the adsorbent for separating gases is usually cylindrical type pellet or in the form of beads. The cylindrical type pellet and the beads are prepared usually by extrusion and tumbling granulation utilizing centrifugal force, respectively. Macropores in the inside of the agglomerate are usually collapsed, and such a problem in forming the agglomerate is more serious when using, as a binder, a clay having a plate structure such as kaolin clay or bentonite clay. Such an adsorbent has a higher resistance against gas diffusion in the inside of the agglomerate, and it is not possible to effectively use the center portion of the adsorbent.

Adsorption of the adsorbable component on the crystalline zeolite is an exothermic process. However, desorption of the adsorbable component from the crystalline zeolite is an endothermic process, and a higher energy is required for desorption of the adsorbable component than adsorption of the adsorbable component. Accordingly, to obtain the desired gas separation performance, it is required to quickly evacuate the adsorbable component desorbed from the crystalline zeolite to the exterior of the adsorbent. Particularly, in the case where the amount of the adsorbable component adsorbed on the crystalline zeolite is large, in order to evacuate a larger quantity of the adsorbable component to the exterior of the adsorbent during desorption, a higher desorption rate is required. A high adsorption rate when adsorbing the adsorbable component is also an important factor. Further, although the adsorbent for separating gases is used in a state where water is removed (activated state), the crystalline zeolite has a strong affinity with water, and there is a fear that water in the atmosphere may be re-adsorbed. If water remains in the adsorbent due to water adsorption, the adsorption site for gas is occupied with water, thereby gas separation deteriorates, and the desired performance is less likely to be obtained.

For example, in the case of using lithium-exchanged faujasite type zeolite as a crystalline zeolite for separating air by PSA method, since the amount of nitrogen adsorbed is large, it is necessary to adsorb and desorb a larger amount of nitrogen as compared with the case of using a crystalline zeolite exchanged with e.g. calcium, and unless the diffusion rate of nitrogen during adsorption and desorption is adequately improved, the adequate performance of the adsorbent can not be obtained. Further, in operating PSA, if the time for the adsorption and desorption step shortens, adsorption and desorption of nitrogen in a short period of time is required, and an adequate performance can not be obtained unless an adsorbent is used wherein the diffusion rate during adsorption and desorption is improved. Further, in order not to deteriorate the performance of the adsorbent itself, it is required to make the water content in the adsorbent as small as possible.

It is an object of the present invention to provide an adsorbent for separating gases which is excellent in the diffusion rate of the adsorbable component during desorption, and which has macropores having an average pore diameter suitable for conditions for desorbing the adsorbable component, in order to reduce the electric power consumption by PSA apparatus, for separating gas mixture, particularly for separating gases by PSA method. It is also the object of the present invention to provide an adsorbent for separating gases which has macropores advantageous for adsorption and desorption of the adsorbable component, and at the same time which is excellent in strength properties represented by crush strength, and which has a small water content. Further, the present invention is to provide a process for easily producing such an adsorbent for separating gases.

The present inventors have conducted extensive studies on the macropore structure of the adsorbent for separating gases and the diffusion of the adsorbable component in the macropores, and found that an adsorbent for separating gases which comprises a binder and a crystalline low-silica faujasite type zeolite with a $SiO_2/Al_2O_3$ molar ratio of from 1.9 to 2.1, wherein the average diameter of the macropores is equal to or larger than the mean free path of an adsorbable component when desorbing the adsorbable component, and at least 70% of the total volume of the macropores is occupied by macropores having a diameter equal to or larger than the mean free path of the adsorbable component, is excellent in the adsorption and desorption performance of the adsorbable component, particularly in the diffusion rate of the adsorbable component during desorption. Further, they have found that the desired adsorbent for separating gases can be obtained by adding water to a crystalline low-silica faujasite type zeolite with a $SiO_2/Al_2O_3$ molar ratio of from 1.9 to 2.1, and from 5 to 30 parts by weight of a binder based on 100 parts by weight of the crystalline low-silica faujasite type zeolite as dried, so that the bulk density is from 0.8 to 1.0 kg/l, followed by kneading, agglomerating, calcinating, ion-exchanging and activating. The present invention has been accomplished on the basis of these discoveries.

Now, the present invention will be described in further detail.

The adsorbent for separating gases of the present invention is an adsorbent for separating gases which comprises a binder and a crystalline low-silica faujasite type zeolite with a $SiO_2/Al_2O_3$ molar ratio of from 1.9 to 2.1, wherein the average diameter of the macropores is equal to or larger than the mean free path of an adsorbable component when desorbing the adsorbable component from the adsorbent, and at least 70% of the total volume of the macropores is occupied by macropores having a diameter equal to or larger than the mean free path of the adsorbable component.

For example, when separating gases by PSA method wherein an adsorbing step and a desorbing step are repeated, pressure is exerted on the adsorbent during the adsorbing step and molecular diffusion mainly takes place wherein molecules diffuse while they collide against one another in the macropores of the adsorbent. However, the desorbing step is conducted under reduced pressure, and the mean free path of the adsorbable component tends to be large, and in the macropores of the adsorbent, collision of molecules against the wall of macropores frequently takes place, in addition to molecular movement by the molecular diffusion. Accordingly, the diffusion resistance in the adsorbent during the desorbing step is larger than during the adsorbing step. Therefore, in the case where the average pore diameter of the macropores is smaller than the mean free path of the adsorbable component when desorbing the adsorbable component, or in the case where less than 70% of the total volume of the macropores is occupied by macropores having a diameter equal to or larger than the mean free path of the adsorbable component, the diffusion resistance in the inside of the macropores of the adsorbable component is large, whereby the adequate performance of the adsorbent for separating gases can not be obtained.

Further, it is preferred that the adsorbent for separating gases has a total macropore volume of at least 0.25 cc/g and a pore surface area of at least 20 m²/g. Usually, the major part of the macropores of the adsorbent for separating gases is occupied by pores having a pore diameter of at least 1,000 Å. However, if macropores are formed by such pores having a relatively large diameter alone, the crush strength of the adsorbent tends to be weak. By suitably incorporating pores having a relatively small diameter (for example, smaller than 1,000 Å) among pores having a relatively large diameter, an adsorbent which is excellent in the strength properties can be obtained without reducing the total volume of macropores. Further, such pores having a relatively small diameter can serve as paths for gases, whereby the diffusion resistance of the adsorbable component during adsorption can be made small, as the mean free path of the adsorbable component is small during the adsorbing step wherein the pressure is high.

The macropores in the adsorbent for separating gases of the present invention are pores having a pore diameter within a range of from 60 Å to 200 μm, as measured by the method of mercury penetration within a pressure range of from 1 to 30,000 psi. The average pore diameter of the macropores can be obtained from relation between the pore diameter obtained by the method of mercury penetration and the pore volume (pore diameter distribution curve), as a diameter at 50% of the total pore volume (median diameter) or a diameter when the gradient of the pore diameter distribution curve is maximum (modal diameter).

The mean free path of the adsorbable component is an average distance that molecules in the adsorbable component move during the successive collisions. The mean free path can be calculated from the pressure and the temperature at the stage of desorbing the adsorbable component from the adsorbent by PSA method, referring to ALBERTY PHYSICAL CHEMISTRY (fourth edition), 312–314, by ROBERT A. ALBERTY; KAGAKU-GIJYUTU PUBLISHING CO., LTD.

The zeolite for the adsorbent for separating gases of the present invention is a crystalline low-silica faujasite type zeolite with a $SiO_2/Al_2O_3$ molar ratio of from 1.9 to 2.1 (hereinafter referred to as LSX zeolite). The $SiO_2/Al_2O_3$ molar ratio of the LSX zeolite is theoretically 2.0. However, when considering errors in measurement by the chemical composition analysis, it is evident that the LSX zeolite having a composition with a $SiO_2/Al_2O_3$ molar ratio of from 1.9 to 2.1 is within the range of the present invention. Many methods for synthesizing a LSX zeolite with a $SiO_2/Al_2O_3$ molar ratio of from 1.9 to 2.1 have been disclosed. For example, it is possible to synthesize the LSX zeolite by a method disclosed in JP-B-5-25527.

In the case of using the LSX zeolite for an adsorbent for separating gases, the higher the crystal purity of the LSX zeolite, the more excellent the separating efficiency, and the crystal purity of the LSX zeolite is preferably at least 90%. Measurement of the crystal purity of the LSX zeolite can be carried out, for example, by an X-ray powder diffraction method, by measuring the amount of gas absorbed, by measuring the amount of water absorbed or by NMR method.

As the binder in the form of fibers to be used for the adsorbent for separating gases of the present invention, a binder of needle crystals in the form of fibers is preferred to form macropores of the present invention, which contains sepiolite clay or attapulgite clay, and which exists, as a binder, among LSX zeolite particles in the adsorbent. Such clays may be used alone or as a mixture of two or more of them.

If a binder in the form of plates is used, there is a possibility that the binder inhibits diffusion of the adsorbable component due to the shape. Further, water is not quickly removed during calcinating after forming, whereby there is a possibility that crystal of the LSX zeolite is destroyed.

The adsorbent for separating gases of the present invention is preferably in the form of beads, and the shape is not particularly limited so long as it has the characteristic of the adsorbent for separating gases of the present invention and may, for example, be spherical or elliptical. In order to adequately obtain the desired performance of the adsorbent for separating gases, the diameter is preferably from 0.5 to 5 mm, considering the size of the apparatus to be packed, the pressure drop in the packed bed or the diffusion resistance in the inside of the agglomerate.

With regard to the compositional ratio of the LSX zeolite to the binder in the adsorbent for separating gases of the present invention, considering the macropore structure and strength properties of the agglomerate, the compositional ratio of the LSX zeolite is usually preferably from 5 to 30 parts by weight.

It is preferred that the water content of the adsorbent for separating gases is as small as possible, and the adsorbent having a water content of at most 0.8 wt %, particularly at most 0.5 wt %, shows a satisfactory adsorption performance and is preferably used.

Now, the process for producing the adsorbent for separating gases of the present invention will be explained.

The process comprises adding water to a crystalline low-silica faujasite type zeolite with a $SiO_2/Al_2O_3$ molar ratio of from 1.9 to 2.1, and from 5 to 30 parts by weight of a binder based on 100 parts by weight of the crystalline low-silica faujasite type zeolite as dried, so that the bulk density is from 0.8 to 1.0 kg/l, followed by kneading, agglomerating, calcinating, ion-exchanging and activating.

The process for producing the adsorbent for separating gases of the present invention comprises a step of adding a synthesized LSX zeolite powder, a binder and water followed by kneading, a step of agglomerating the kneaded product, a step of drying and calcinating the agglomerate, a step of ion-exchanging the baked agglomerate and a step of activating the ion-exchanged product by calcinating. These steps will be explained below.

Kneading Step

The starting material for the synthetic LSX zeolite powder to be used for the adsorbent for separating gases of the present invention is a (Na,K) type LSX zeolite synthesized by a method as disclosed, for example, in JP-B-5-25527.

The synthesized LSX zeolite powder and the binder are mixed and kneaded while adjusting the amount of water to make the mixture uniform, and then adequately kneaded so that the bulk density is from 0.8 to 1.0 kg/l. If the bulk density is smaller than 0.8 kg/l, compaction is not sufficient, bubbles are likely to form between mixed particles, whereby the granulation property tends to be low. If the kneaded product is excessively compacted to a bulk density of more than 1.0 kg/l, the macropores in the adsorbent may be collapsed.

In order to form the desired macropores, keep a high adsorption capacity and make the physical strength of the adsorbent high, the amount of the binder added is preferably within a range of from 5 to 30 parts by weight based on 100 parts by weight of the (Na,K) type LSX zeolite. If the amount of the binder is less than 5 parts by weight, the proportion of the LSX zeolite increases, such being advantageous for adsorption of the adsorbable component. However, the particle strength of the adsorbent tends to be weak, and breaking or attrition may result in the packed bed. If the amount of the binder blended is larger than 30 parts by weight, although the particle strength can be made high, the proportion of the LSX zeolite decreases, and the adsorption capacity of the adsorbable component decreases when separating gases.

The amount of water added when kneading the LSX zeolite powder and the binder, varies depending upon the properties of the LSX zeolite powder and the binder as the starting materials, or upon the proportion of them. However, the total amount of water added is preferably within a range of from 60 to 65 parts by weight based on 100 parts by weight of the LSX zeolite powder.

Further, as an additive besides water, an additive such as carboxymethylcellulose or a polyvinyl alcohol may be added.

Agglomerating Step

The kneaded mixture having a bulk density of from 0.8 to 1.0 kg/l is agglomerated as follows. It is preferred that the mixture is agglomerated by blade agitation granulation, since strong shear force can be given to the mixture by blade agitation as compared with the conventional tumbling granulation method, the binder added is dispersed uniformly, binder particles adhere to the LSX zeolite particles and exist between the zeolite particles, to form macropores. The form of the agglomerate is not particularly limited so long as it meets a characteristic of the adsorbent for separating gases of the present invention. It may be formed into a sphere or an ellipse and it may, for example, be an agglomerate in the shape of beads having a size of from 0.5 to 5 mm. Further, in the case where physical strength, particularly attrition strength is required for an application as an adsorbent, the agglomerate is preferably in the shape of beads having a high sphericity. It is possible to granulate the agglomerated spherical product by a known method such as using MARUMERIZER forming apparatus, to make the surface of the agglomerate smooth.

The agglomerate in the shape of a pellet is agglomerated by extrusion in general. Although it is difficult to control the macropores as compared with the agglomerate in the shape of beads, it is possible to obtain the desired macropore structure, by using carboxymethylcellulose or a polyvinyl alcohol which are known as forming aids, and the agglomerate in the shape of a pellet can be used as an adsorbent for separating gases.

The diameter of beads which is agglomerated and granulated can be changed depending upon applications, and it is possible to classify the size by using e.g. a sieve.

Calcinating Step

The agglomerate thus obtained is dried and calcinated, and the binder added was calcinated. As a method of drying and calcinating, a conventional method can be employed, and e.g. a hot air dryer, a muffle furnace, a rotary kiln or a tube furnace may be used. The temperature of calcinating may be a temperature wherein the binder is calcinated and zeolite crystal is not destroyed so that the form of the adsorbent can be maintained. In general, the calcinating is conducted at a temperature of from 400 to 700° C.

Further, calcinated agglomerate is cooled and may be humidified so that the water content is from about 20 to about 30%. Although humidifying operation is not essential, it is effective to prevent breakage such as cracking of the agglomerate resulting from a sudden heating due to water-adsorbing when contacting with the ion-exchange solution during ion-exchanging in the next step, and it is also effective to evacuate the adsorbed gas such as nitrogen from inside of the agglomerate, and to make the diffusion with the ion-exchange solution effective.

Ion-exchanging Step

The agglomerate formed and calcinated in the above steps, is contacted with an ion-exchange solution having cations such as lithium, potassium, calcium, strontium or barium, to conduct ion-exchanging. The type of cation can be selected depending upon the gas adsorbed. For example, in the case where nitrogen in the air is adsorbed to separate the air, lithium cation is suitable. The compound to be used for ion-exchanging is not particularly limited so long as it can be in a form of an aqueous solution, and a chloride, a nitrate, a sulfate or a carbonate may, for example, be preferably used.

As a method for ion-exchanging, batch method or column flow method is usually employed. The batch method is suitable for uniform ion-exchanging. In order to conduct effective ion-exchange by raising the proportion of exchange ion contacted, or to reduce the amount of ion-exchange solution, it is preferred to adjust the flow rate by employing the column flow method. Particularly, in the case where ion-exchanging is difficult such as ion-exchanging lithium cations, the column flow method is preferred.

The temperature during ion-exchanging is preferably as high as possible in order to improve the rate and efficiency of ion-exchange. It is usually from 50 to 100° C.

The concentration of ion-exchange solution to be used is generally from about 1 to about 4 N, considering the ion-exchange rate. The ion-exchange solution is preferably alkaline so that LSX zeolite crystal is not destroyed during ion-exchanging, and it is generally adjusted to have a pH (hydrogen ion concentration) of from 9 to 12, by adding a hydroxide or the like.

After ion-exchanged as mentioned above, the agglomerate is taken out from the ion-exchange solution, washed with water or hot water, and dried at a temperature of usually from about 30 to about 100° C.

Activating Step

The agglomerate thus ion-exchanged is activated to remove water, and the desired adsorbent for separating gases can be obtained. The purpose of activation is to remove water in the agglomerate. Water is removed under reduced pressure or by calcinating. In general, removal of water by calcinating is preferably conducted. The condition of activation may be any condition wherein water is removed from the agglomerate. In the case where the agglomerate is activated by calcinating, it is preferred to quickly remove water at a temperature as low as possible, considering the heat resistance of the LSX zeolite. In general, the agglomerate is calcinated at a temperature condition of at most 600° C., for example, it is calcinated at a temperature of 500° C. for about 1 hour.

The adsorbent for separating gases obtained in the above steps, is used to adsorb and separate the mixed gas by adsorbing the adsorbable component in the mixed gas for separation and concentration. For example, it is used to recover concentrated oxygen gas by selectively adsorbing nitrogen in the air. The process of concentrating and recovering oxygen gas in the air by PSA method is operated by successive steps of an adsorbing step wherein the air is contacted with the packed bed and nitrogen is selectively adsorbed to recover concentrated oxygen from the outlet of the packed bed; a regeneration step wherein the contact of the air and the packed bed is interrupted, the pressure in the packed bed is reduced to desorb the adsorbed nitrogen and to evacuate it; and a pressure-regaining step wherein pressure is exerted to the inside of the packed bed by concentrated oxygen obtained in the above adsorbing step. The PSA apparatus for separating the air comprises a plurality of adsorption beds, usually 2 beds or 3 beds. The air is supplied from a blower or a compressor. As water in the air may inhibit adsorption of nitrogen, it is necessary to remove water in the air before the air is introduced to the packed bed. The air is dehumidified usually to the dew point of −50° C. or lower. The temperature of the air has a close relation with performance of the adsorbent, and the air may be heated or cooled in order to obtain an adequate performance of the adsorbent. However, it is usually from about 15 to about 35° C.

The higher the adsorption pressure in the adsorbing step, the higher the amount of nitrogen adsorbed. Considering the loading to the blower or the compressor which supplies the air, the adsorption pressure may be within a range of from 760 Torr to 1,520 Torr.

The lower pressure in the regeneration step is preferred since more nitrogen can be desorbed. Considering the loading to the vacuum pump, the regeneration pressure may be within a range of from 100 Torr to 400 Torr.

In the pressure-regaining step, as the concentrated oxygen gas obtained in the adsorbing step is used, if regained pressure is high, the amount of the concentrated oxygen gas taken out as a product gas decreases. Further, if the adsorbing step starts in the state where the regained pressure is low, as pressure is exerted to the air, there are fears that nitrogen is not adsorbed on the adsorbent and breaks through the outlet of the packed bed. In order to prevent nitrogen in the air from breaking through the outlet of the packed bed, the pressure may be regained by returning the concentrated oxygen gas back to the packed bed counter-currently to the air for the initial period of about 1 to about 5 seconds after the adsorbing step is started. The return pressure may be within a range of from 400 Torr to 800 Torr.

With regard to the adsorbent for separating gases of the present invention, the average diameter of the macropores is equal to or larger than the mean free path of the adsorbable component when desorbing the adsorbable component from the adsorbent, and at least 70% of the total volume of the macropores is occupied by macropores having a diameter equal to or larger than the mean free path of the adsorbable component. Therefore, the diffusion rate of the adsorbable component in the inside of the macropores during desorption under reduced pressure is particularly high, and the utilization ratio of the adsorbent for separating gases is high. Further, it is considered that the adsorbent for separating gases of the present invention is excellent in physical strength properties since pores having a relatively small pore diameter are suitably incorporated among macropores in addition to pores having a relatively large pore diameter. The adsorbent for separating gases of the present invention is more effective for separating the air by PSA method. Therefore, the amount taken out and the recovery ratio of the concentrated oxygen gas are high when the air-separation by PSA method is conducted, and it is possible to reduce the electric power consumption rate when operating the PSA apparatus.

EXAMPLES

Now, the present invention will be described in further detail with reference to Examples. However, it should be understood that the present invention is by no means restricted to such specific Examples. Each evaluation is based on following methods.

(1) Average Pore Diameter, Pore Volume and Pore Surface Area of Macropores

By using mercury porosimeter (produced by MICROMERITICS, type: PORE SIZER 9310), activated adsorbent was measured within a pressure range of from 1 to 30,000 psi (within pore diameter range of from 60 Å to 200 $\mu$m). From the relation between pore diameter and pore volume obtained by measurement (pore diameter distribution curve), the average pore diameter of the adsorbent can be obtained as a pore diameter at 50% of the total pore volume (median diameter) or a diameter when the grade of the pore diameter distribution curve is maximum (modal diameter). In the present Example, the median diameter was employed.

(2) Amount of Nitrogen Adsorbed

For measurement in Examples 1 to 15 and Comparative Examples 1 to 12, gravimetric method was employed by using an electronic balance (CAHN 2000 type). As the preliminary treatment, the adsorbent was activated for 2 hours at a temperature of 350° C. under vacuum of at most $10^{-3}$ Torr. The adsorption temperature was kept at –10° C., 0° C. or 25° C., nitrogen gas was introduced, and the weight was measured in the adequate equilibrium state to calculate the amount adsorbed (unit: Ncc/g). Each amount of nitrogen adsorbed in Examples and Comparative Examples shown hereinafter is a measured value under 700 Torr.

For measurement in Examples 16 to 18 and Comparative Example 13, volumetric method was employed by using BELSORP 28SA (BEL JAPAN, INC.). As the preliminary treatment, the adsorbent was subjected to deairing treatment for 2 hours at room temperature (about 25° C.) under vacuum of at most $10^{-3}$ Torr. The adsorption temperature was kept at 25° C., and the amount adsorbed was measured to about 800 Torr (unit: Ncc/g). Each amount of nitrogen adsorbed in Examples and Comparative Example is a measured value under 700 Torr.

(3) Air Separation Test by PSA Method

By using a testing device for air-separation performance as illustrated in FIG. 1, air separation test was conducted as follows. About 2 l of adsorbent for separating gases was packed in adsorption beds (13) and (14). While an adsorption bed (13) was in the adsorbing step, the air compressed by a compressor (1) was dehumidified by a dehydrating bed (2), the pressure was reduced by a pressure reducing valve (3) to from 0.5 to 0.6 kg/cm²G, and solenoid valves (5) and (7) were kept open to flow the air through the adsorption bed (air temperature: 25° C.). The obtained concentrated oxygen gas was reserved in a product tank (17), and the amount of the concentrated oxygen gas taken out was adjusted by a mass flow meter (18). The pressure at the final of the adsorbing step was constant at 1.4 atm. While the adsorption bed (13) was in the regeneration step, the solenoid valves (5) and (7) were closed, a solenoid valve (6) was kept open, and pressure in the inside of the adsorption bed was reduced by a vacuum pump (20). The final pressure at the final of the regeneration step was constant at 250 Torr. While an adsorption bed (13) was in the pressure-regaining step, the solenoid valve (6) was closed, a solenoid valve (8) was kept open, and the pressure in the inside of the adsorption bed was regained by the concentrated oxygen gas in the product tank (17). The pressure at the final of the pressure-regaining step was constant at 500 Torr. The pressure was measured by a pressure gauge (15) (for an adsorption bed (14), a pressure gauge (16) was used). Then the adsorbing step was conducted in the pressure-regained adsorption bed (13), and these steps were successively repeated. The time for the adsorbing step, the regeneration step and the pressure-regaining step were 1 minute, 30 seconds and 30 seconds, respectively. The operations of the solenoid valves were controlled by a sequencer.

The same steps are conducted in an adsorption bed (14). In order to continuously take out the concentrated oxygen gas, the adsorption bed (14) was in the regeneration step and the pressure-regaining step while the adsorption bed (13) was in the adsorbing step, and the adsorption bed (14) was in the adsorbing step while the adsorption bed (13) was in the regeneration step and the pressure-regaining step.

The concentration of the concentrated oxygen gas was measured by an oxygen meter (19) after the value became constant, and the precise amount of the concentrated oxygen gas flowing (hereinafter referred to as amount of oxygen) was obtained from the value measured by an integrating flow meter (21). And the amount of exhausted gas evacuated from the vacuum pump (20) during the regeneration step (hereinafter referred to as amount of exhausted gas) was obtained from the value measured by an integrating flow meter (22). Each amount of gas was measured at 25° C.

The air-separation performance of the adsorbent was represented by the amount of oxygen at a concentration of 93% and the ratio of the concentrated oxygen gas at a concentration of 93% recovered from the air (hereinafter referred to as recovery ratio). The air separation test was conducted at a temperature of the adsorption bed of 0° C. and 25° C.

The amount of oxygen was obtained by calculating the value measured by the integrating flow meter to the normal state, and represented as an amount of oxygen flowing in 1 hour per kg of the adsorbent as dried. The unit is NL/(kg•hr). The recovery ratio was calculated from the following formula.

Recovery ratio={(amount of oxygen)×0.93}/ {(amount of the air supplied)×0.209}×100(%)

Amount of the air supplied=(amount of oxygen)+(amount of exhausted gas)

(4) Mean Free Path of Nitrogen when Nitrogen is Desorbed

The mean free path of nitrogen ($\lambda$) was calculated from the following formula by using the temperature of the adsorption bed (T) and the final pressure at the regeneration step (P) which are conditions for the air separation test as mentioned above In the case of separating the air by PSA method, the temperature of the adsorbent raises by heating in the adsorbing step, and the temperature of the adsorbent lowers by heat-absorbing in the desorbing step, thus leading to fluctuation of temperature. Therefore, as the temperature for calculating the mean free path of nitrogen, actual temperature of the adsorbent, the temperature of the adsorption bed (ambient environment) or the temperature of gas introduced may be employed. In the present Example, the temperature of the adsorption bed was employed.

$\lambda = \kappa T / \{(\sqrt{2}) \pi P \sigma^2\}$

σ: Molecular diameter of nitrogen $3.681 \times 10^{-10}$ (m)

π: Boltzmann's constant $1.3807 \times 10^{-23}$ (J/K)

The mean free path of nitrogen under a pressure of 250 Torr, was 2,052 (Å) or 1,880 (Å) at a temperature of 25° C. or 0° C., respectively.

(5) Crush Strength 25 activated agglomerates were measured by a hardness meter (produced by KIYA SEISAKUSYO LTD., type: KHT-20). The measurement was conducted in the method such that the agglomerate was loaded with an identer having a diameter of 5 mm at a constant rate of 1 mm/sec. The amount loaded when the agglomerate broke was taken as the crush strength (kgf).

(6) Attrition Rate

The attrition rate was calculated in accordance with a measuring method as stipulated in JIS K-1464 (1962). Namely, the activated agglomerate as a test sample was preliminarily left for 16 hours in a desiccator at a temperature of 25° C. at a relative humidity of 80% to reach equilibrium. About 70 g of the test sample was subjected to sieving for 3 minutes by using a screen having sieves of 850 μm and 355 μm and a pan (produced by TOKYO SCREEN CO. LTD, type: JIS Z-8801). Then, 50 g of the remaining test sample obtained by the sieving for 3 minutes, was precisely measured and put on the above screen having deposits removed therefrom. At the same time, five 10-yen copper coins were put in the screen, followed by shaking for 15 minutes. The amount dropped to the pan was taken as X g, and the attrition rate was calculated by the following formula.

Attrition rate (wt %)=(X/50)×100

(7) Bulk Density

The bulk density was measured in accordance with a method using an apparent density apparatus as stipulated in JIS K-3662. The kneaded mixture was put in a polyethylene cup of V ml (W1) so that the cup was heaped with the kneaded product, the kneaded mixture was scraped off by a linear spatula, and then the weight of the cup having the mixture in the inside (W2) was measured to the unit of 0.1 g, and the bulk density was calculated by the following formula.

Bulk density (kg/l)=(W2-W1)/V (8) Water Content

The water content was measured in accordance with the test method by coulometric titration as stipulated in JIS K-0068, by using Karl Fischer moisture meter (produced by MITSUBISHI CHEMICAL CORPORATION, moisture measurement meter: CA-06 type, electric furnace: VA-21 type). The electric furnace was set to 400° C. From about 400 to about 500 mg of the activated test sample was precisely measured quickly, the test sample was put in the sample boat in the electric furnace, and water was vaporized under flowing dry nitrogen at 300 ml/min. The water content was obtained by the following formula from the amount of the test sample (S, unit: g) and the amount of water obtained from coulometric titration (G, unit: μg).

Water content (wt %)=$G/(S \times 10^6) \times 100$

EXAMPLE 1

Synthesis of LSX zeolite was conducted by a known method. To a stainless container for reaction having an internal volume of 20 l, 3,888 g of aqueous sodium aluminate solution ($Na_2O$=20.0 wt %, $Al_2O_3$=22.5 wt %), 7,923 g of water, sodium hydroxide (purity 99%) and 1,845 g of special grade chemical potassium hydroxide (purity 85%) were put and cooled under stirring at 60 rpm (solution a: 5° C.) To a polyethylene container having an internal volume of 10 l, 7,150 g of aqueous sodium silicate solution ($Na_2O$=3.8 wt %, $SiO_2$=12.6 wt %) and 1,176 g of water were put and cooled (solution b: 10° C.). The solution b was put into the solution a over a period of about 5 minutes under stirring. The solution after mixed was transparent. Stirring was kept about 20 minutes after completion of putting solution b. Then, the temperature of water bath was raised to 36° C. As soon as the solution turned cloudy, stirring was stopped, the stirring paddle was taken out, and aging was conducted at a temperature of 36° C. for 48 hours.

Then, the temperature of water bath was raised to 70° C., and crystallization was conducted for 20 hours. The obtained crystal was subjected to filtration, adequately washed with pure water, and dried overnight at a temperature of 80° C. As a result of X-ray analysis, the structure of the obtained crystal powder was faujasite monophase, and had a purity of at least 98%. Further, as a result of ICP emission analysis, the composition of the obtained crystal powder was $0.72Na_2O \cdot 0.28K_2O \cdot Al_2O_3 \cdot 2.0SiO_2$, and it is confirmed that the crystal powder was LSX zeolite.

The LSX zeolite powder and 20 parts by weight of attapulgite clay based on 100 parts by weight of the LSX zeolite powder were mixed and kneaded by MIXMULLER MIXING MACHINE (produced by SINTOKOGIO, LTD., type: MSG-05S), while suitably adding water. Finally, 65 parts by weight of water based on 100 parts by weight of the LSX zeolite powder was added, followed by kneading. The bulk density of the obtained kneaded product was 0.85 kg/l.

The kneaded product was stirred and formed into beads having a diameter of from 1.2 to 2.0 mm, by blade agitation granulater HENSCHEL MIXER (produced by MITSUI MINING COMPANY, LTD., type: FM/I-750), which was then granulated by using MARUMERIZER EXTRUDER (produced by FUJI PAUDAL CO., LTD., type: Q-1000), followed by drying overnight at a temperature of 100° C. Then, the agglomerate was calcinated for 2 hours at a temperature of 600° C. under flowing the air by using a horizontal type tube furnace (produced by ADVANTEC), to calcinate attapulgite clay. Then, it was cooled in atmosphere, and moisturized so that the water content is about 25%.

The agglomerate was packed in a column of 70 mm ø×700 mm (length), and an aqueous solution having lithium chloride adjusted to a concentration of 1 mol/l was flowed at a temperature of 80° C. to conduct lithium ion-exchange. Then, the agglomerate packed in the column was adequately washed with pure water, and taken out from the column, followed by drying for 16 hours at temperature of 40° C.

Then, the agglomerate was subjected to activation treatment by using a horizontal type tube furnace (produced by ADVANTEC) for 1 hour at a temperature of 500° C. under flowing the air, and wrapped without cooling. The average pore diameter and the pore volume of the macropores in the obtained adsorbent for separating gases were measured. The amount of nitrogen adsorbed and the air-separation performance were measured at an adsorption temperature of 25° C. by the above-mentioned methods. Water content of the adsorbent for separating gases was at most 0.1 wt %. The results are shown in Table 1.

EXAMPLE 2

The same operations as in Example 1 were conducted, except that the bulk density of the kneaded product was 0.90 kg/l. The results of measuring the obtained adsorbent for separating gases are shown in Table 1.

EXAMPLE 3

The same operations as in Example 1 were conducted, except that sepiolite clay was used as a binder. The results of measuring the obtained adsorbent for separating gases are shown in Table 1.

EXAMPLES 4, 5 and 6

By using the same adsorbent for separating gases used in Examples 1, 2 or 3, respectively, the amount of nitrogen absorbed and the air-separation performance were measured at an adsorption temperature of 0° C. The results of measuring the obtained adsorbent for separating gases are shown in Table 2.

EXAMPLE 7

The same operations as in Example 1 were conducted, except that 15 parts by weight of sepiolite clay was used as a binder. The results of measuring the pore volume, the pore surface area, the crush strength, the attrition rate and the amount of nitrogen adsorbed (adsorption temperature: −10° C.) of the obtained adsorbent for separating gases are shown in Table 3.

EXAMPLES 8 to 15

The same operations as in Example 7 were conducted, except that the type and the amount added of the binder were changed as shown in Table 3, to prepare an adsorbent for separating gases. The bulk density of each kneaded product measured by the above method, was within a range of from 0.81 to 0.87 kg/l. The pore volume, the pore surface area, the crush strength, the attrition rate and the amount of nitrogen adsorbed (adsorption temperature: −10° C.) of the obtained adsorbent for separating gases are shown in Table 3.

EXAMPLE 16

The same operations as in Example 1 were conducted to activate the adsorbent for separating gases. Before the adsorbent was wrapped, it is taken out from the tube furnace and cooled to 400° C., sealed in a glass bottle and wrapped, and left to cool to room temperature. The water content and the amount of nitrogen adsorbed of the adsorbent for separating gases thus prepared were evaluated. The measurement results are shown in Table 5.

EXAMPLE 17

The same operations as in Example 16 were conducted except that the adsorbent before wrapped was cooled to 350° C. The measurement results are shown in Table 5.

EXAMPLE 18

The same operations as in Example 16 were conducted except that the adsorbent before wrapped was cooled to 300° C. The measurement results are shown in Table 5.

COMPARATIVE EXAMPLE 1

The same operations as in Example 1 were conducted except that the bulk density of the adsorbent after kneaded and mixed was 1.8 kg/l, and forming was conducted by using MARUMERIZER (produced by FUJI PAUDAL CO., LTD., type: Q-1000) alone. The measurement results of the obtained adsorbent for separating gases are shown in Table 1.

COMPARATIVE EXAMPLE 2

The same operations as in Example 1 were conducted except that the bulk density of the adsorbent after kneaded and mixed was 1.2 kg/l, and forming was conducted by using MARUMERIZER (produced by FUJI PAUDAL CO., LTD., type: Q-1000) alone. The measurement results of the obtained adsorbent for separating gases are shown in Table 1.

COMPARATIVE EXAMPLE 3

The same operations as in Example 1 were conducted except that the bulk density of the adsorbent after kneaded and mixed was 1.2 kg/l. The measurement results of the obtained adsorbent for separating gases are shown in Table 1.

COMPARATIVE EXAMPLES 4, 5 and 6

By using the same adsorbent for separating gases used in Comparative Examples 1 or 2, the amount of the nitrogen adsorbed and the air-separation performance were measured at an adsorption temperature of 0° C. The measurement results of the obtained adsorbent for separating gases were shown in Table 2.

COMPARATIVE EXAMPLES 7 to 12

The same operations as in Example 7 were conducted except that the type and the amount added of the binder were changed as shown in Table 4, to prepare an adsorbent for separating gases. The bulk density of each kneaded product was measured by the above method, and found to be within a range of from 0.84 to 0.90 kg/l. The results of measuring the pore volume, the pore surface area and the amount of nitrogen adsorbed (adsorption temperature: −10° C.) of the obtained adsorbent for separating gases were shown in Table 4.

COMPARATIVE EXAMPLE 13

The same operations as in Example 16 were conducted except that the adsorbent before wrapped was cooled to 200° C. The measurement results are shown in Table 5.

With regard to each adsorbent for separating gases shown in Examples 1 to 6, the average pore diameter of the macropores was larger than the mean free path of nitrogen under 250 Torr under which nitrogen was desorbed during the air-separation by PSA process, and at least 70% of the total pore volume was occupied by the pores having a pore diameter of equal to or larger than the mean free path, and the diffusivity in the macropore under condition of 250 Torr was high. Therefore, the air-separation performance of the adsorbent for separating gases was excellent.

With regard to each adsorbent for separating gases of Comparative Example 1 or 4, the average pore diameter of the macropores was smaller than the mean free path of nitrogen under 250 Torr under which nitrogen was adsorbed during the air-separation by PSA process, and less than 70% of the total pore volume was occupied by the pores having a pore diameter of equal to or larger than the mean free path, and the diffusivity in the macropore was small. Therefore, although the amount of nitrogen adsorbed under equilibrium was about same as the adsorbents in Examples, the air-separation performance was lower as compared with the adsorbents in Examples. With regard to each adsorbent for separating gases of Comparative Example 2, 3 or 5, 6, although the average pore diameter of the macropores was larger than the mean free path under 250 Torr, less than 70% of the total pore volume was occupied by the pores having a pore diameter of equal to or larger than the mean free path, and the air-separation performance was lower as compared with the adsorbents in Examples.

Further, by comparing Examples 7 to 15 and Comparative Examples 7 to 12, it was found that the adsorbents obtained in Examples 7 to 15 had a higher pore volume, pore surface area and amount of nitrogen adsorbed, and were more excellent as an adsorbent for separating gases.

By comparing Examples 16 to 18 and Comparative Example 13, it was found that the adsorbents obtained in Examples 16 to 18 having a water content of at most 0.8 wt %, had a higher amount of nitrogen adsorbed, and were thus preferable as an adsorbent for separating gases.

TABLE 1

Air-separation performance of adsorbents at an adsorption temperature of 25° C.

| | Type of clay | Average pore diameter (Å) | Pore volume (cc/g) | Proportion of pores having a diameter of at least 2052 Å in volume (%) | Amount of nitrogen adsorbed (25° C.) (Ncc/g) | Air-separation performance Amount of oxygen (NL/kgh) | Recovery ratio (%) |
|---|---|---|---|---|---|---|---|
| Examples | | | | | | | |
| 1 | Attapulgite | 5000 | 0.27 | 81.5 | 21.8 | 103.9 | 61.6 |
| 2 | Attapulgite | 4300 | 0.32 | 71.9 | 21.4 | 103.2 | 61.5 |
| 3 | Sepiolite | 4730 | 0.28 | 82.1 | 23.2 | 102.6 | 61.2 |
| Comparative Examples | | | | | | | |
| 1 | Attapulgite | 1490 | 0.25 | 24.0 | 21.2 | 95.1 | 58.2 |
| 2 | Attapulgite | 2890 | 0.32 | 65.6 | 22.0 | 99.2 | 58.7 |
| 3 | Attapulgite | 2700 | 0.30 | 60.0 | 22.4 | 95.5 | 57.7 |

TABLE 2

Air-separation performance of adsorbents at an adsorption temperature of 0° C.

| | Type of clay | Average pore diameter (Å) | Pore volume (cc/g) | Proportion of pores having a diameter of at least 2052 Å in volume (%) | Amount of nitrogen adsorbed (25° C.) (Ncc/g) | Air-separation performance Amount of oxygen (NL/kgh) | Recovery ratio (%) |
|---|---|---|---|---|---|---|---|
| Examples | | | | | | | |
| 4 | Attapulgite | 5000 | 0.27 | 85.2 | 34.2 | 98.8 | 56.1 |
| 5 | Attapulgite | 4300 | 0.32 | 71.9 | 33.9 | 101.1 | 56.9 |
| 6 | Sepiolite | 4730 | 0.28 | 85.7 | 36.2 | 99.7 | 57.0 |
| Comparative Examples | | | | | | | |
| 4 | Attapulgite | 1490 | 0.25 | 32.0 | 33.3 | 92.5 | 54.2 |
| 5 | Attapulgite | 2890 | 0.32 | 68.8 | 34.0 | 96.6 | 54.8 |
| 6 | Attapulgite | 2700 | 0.30 | 63.3 | 34.9 | 93.7 | 54.3 |

TABLE 3

| Examples | Type of clay used | Amount of clay used (parts by weight) | Pore volume (cc/g) | Pore surface area (m²/g) | Crush strength (kgf) | Attrition rate (%) | Amount of nitrogen adsorbed (−20° C.) (Ncc/g) |
|---|---|---|---|---|---|---|---|
| 7 | Sepiolite | 15 | 0.31 | 21.9 | 1.5 | 0.1 | 32.0 |
| 8 | Sepiolite | 15 | 0.31 | 22.7 | 1.6 | 0.2 | 31.5 |
| 9 | Sepiolite | 20 | 0.29 | 28.2 | 1.9 | 0.1 | 30.8 |

TABLE 3-continued

| Examples | Type of clay used | Amount of clay used (parts by weight) | Pore volume (cc/g) | Pore surface area (m²/g) | Crush strength (kgf) | Attrition rate (%) | Amount of nitrogen adsorbed (−20° C.) (Ncc/g) |
|---|---|---|---|---|---|---|---|
| 10 | Sepiolite | 20 | 0.27 | 28.1 | 2.1 | 0.1 | 30.6 |
| 11 | Sepoilite | 25 | 0.26 | 32.3 | 2.4 | 0.1 | 29.9 |
| 12 | Attapulgite | 15 | 0.30 | 22.0 | 1.3 | 0.3 | 31.0 |
| 13 | Attapulgite | 20 | 0.28 | 25.7 | 1.8 | 0.1 | 30.0 |
| 14 | Attapulgite | 20 | 0.28 | 26.1 | 1.9 | 0.1 | 30.1 |
| 15 | Attapulgite | 25 | 0.25 | 35.1 | 2.3 | 0.1 | 29.2 |

The amount of clay used (parts by weight) is based on 100 parts by weight of zeolite.

TABLE 4

| Comparative Examples | Type of clay used | Amount of clay used (parts by weight) | Pore volume (cc/g) | Pore surface area (m²/g) | Amount of nitrogen adsorbed (−10° C.) (Ncc/g) |
|---|---|---|---|---|---|
| 7 | Kaolin | 15 | 0.24 | 16.9 | 29.0 |
| 8 | Kaolin | 20 | 0.23 | 19.8 | 28.1 |
| 9 | Kaolin | 25 | 0.21 | 21.1 | 27.9 |
| 10 | Bentonite | 15 | 0.23 | 16.5 | 26.7 |
| 11 | Bentonite | 20 | 0.22 | 18.6 | 25.8 |
| 12 | Bentonite | 25 | 0.22 | 19.7 | 24.3 |

The amount of clay used (parts by weight) is based on 100 parts by weight of zeolite.

TABLE 5

| | Water content (wt %) | Amount of nitrogen (25° C.) (Ncc/g) |
|---|---|---|
| Example 16 | 0.30 | 20.8 |
| Example 17 | 0.48 | 20.0 |
| Example 18 | 0.71 | 18.2 |
| Comparative Example 13 | 0.98 | 16.3 |

As mentioned above, with regard to the adsorbent for separating gases of the present invention, the average pore diameter of the macropores is larger than the mean free path of the adsorbable component when desorbing the adsorbable component, and at least 70% of the total macropore volume is occupied by pores having a pore diameter of equal to or larger than the mean free path of the adsorbable component. Therefore, the diffusion rate of the adsorbable component in macropores during desorption under reduced pressure is high, and the utilization ratio of the adsorbent is high. Further, by suitably incorporating pores having a relatively small diameter, it is excellent in strength properties. The adsorbent for separating gases of the present invention is more effectively used when it is exchanged with lithium cations, and it is used for separating the air by PSA method. Therefore, when separating the air by PSA method, the amount of the concentrated oxygen gas taken out and the recovery ratio are high, and it is possible to reduce the power consumption when operating the PSA apparatus. Further, according to the process of the present invention, it is possible to easily obtain an adsorbent for separating gases.

What is claimed is:

1. An adsorbent for separating gases, which comprises a binder and a crystalline low-silica faujasite type zeolite with a $SiO_2/Al_2O_3$ molar ratio of from 1.9 to 2.1, wherein the average pore diameter of the macropores is equal to or larger than the mean free path of an adsorbable component when desorbing the adsorbable component from the adsorbent, and at least 70% of the total volume of the macropores is occupied by macropores having a diameter equal to or larger than the mean free path of the adsorbable component.

2. The adsorbent for separating gases according to claim 1, wherein the macropores have a total volume of at least 0.25 cc/g and a pore surface area of at least 20 m²/g.

3. The adsorbent for separating gases according to claim 1, wherein the purity of the crystalline low-silica faujasite type zeolite is at least 90%.

4. The adsorbent for separating gases according to claim 1, wherein the binder is sepiolite clay and/or attapulgite clay.

5. The adsorbent for separating gases according to claim 1, which is in the form of beads.

6. The adsorbent for separating gases according to claim 1, wherein the crystalline low-silica faujasite type zeolite is ion-exchanged with lithium cations.

7. The adsorbent for separating gases according to claim 1, which has a water content of at most 0.8 wt %.

8. A process for producing an adsorbent for separating gases as defined in claim 1, which comprises adding water to a crystalline low-silica faujasite type zeolite with a $SiO_2/Al_2O_3$ molar ratio of zeolite crystal of from 1.9 to 2.1, and from 5 to 30 parts by weight of a binder based on 100 parts by weight of the crystalline low-silica faujasite type zeolite as dried, so that the bulk density is from 0.8 to 1.0 kg/l, followed by kneading, agglomerating, calcinating, ion-exchanging and activating.

9. The process for producing an adsorbent for separating gases according to claim 8, wherein the binder is sepiolite clay and/or attapulgite clay.

10. The process for producing an adsorbent for separating gases according to claim 8, wherein the adsorbent is formed into beads by blade agitator granulation.

11. The process for producing an adsorbent for separating gases according to claim 8, in which the calcinated agglomerate is ion-exchanged with a solution containing lithium cations.

12. A process for separating gases, which comprises contacting a mixed gas with a packed bed of the adsorbent for separating gases as defined in claim 1.

13. A process for separating a mixture of nitrogen gas and oxygen gas in air, which comprises contacting air with a packed bed of the adsorbent for separating gases of claim 1, to selectively adsorb nitrogen gas from the air leaving oxygen gas.

14. The process for separating nitrogen gas and oxygen gas in air according to claim 13, wherein nitrogen gas in the air is selectively adsorbed by a pressure swing adsorption method.

15. A process for separating oxygen gas from nitrogen gas in air according to claim 14 comprising the steps of:

(1) contacting air with the packed bed of adsorbent and selectively adsorbing nitrogen gas from the air leaving a stream of concentrated oxygen gas from an outlet of the packed bed;

(2) regenerating the packed bed by interrupting air contact with the packed bed and reducing pressure inside of the packed bed to desorb adsorbed nitrogen gas and evacuating the thus desorbed nitrogen gas; and (3) repressurizing the regenerated packed bed by repressurizing it with concentrated oxygen gas obtained in step (1).

16. The process for separating nitrogen gas and oxygen gas in air according to claim 15, wherein the adsorption pressure during adsorbing step (1) is within a range of from 760 Torr to 1520 Torr.

17. The process for separating nitrogen gas and oxygen gas in air according to claim 15, wherein the desorption pressure in regeneration step (2) is within a range of from 100 Torr to 400 Torr.

18. The process for separating nitrogen gas and oxygen gas in air according to claim 15, wherein the pressure during repressurizing step (3) is within a range of from 400 Torr to 800 Torr.

* * * * *